Mar. 6, 1923.

R. I. ATHERTON

APPARATUS FOR EXHIBITING PICTURES

Filed Mar. 22, 1921

Inventor:
Reginald Ignatius Atherton.
Per:- Rayner & Co
Attorneys.

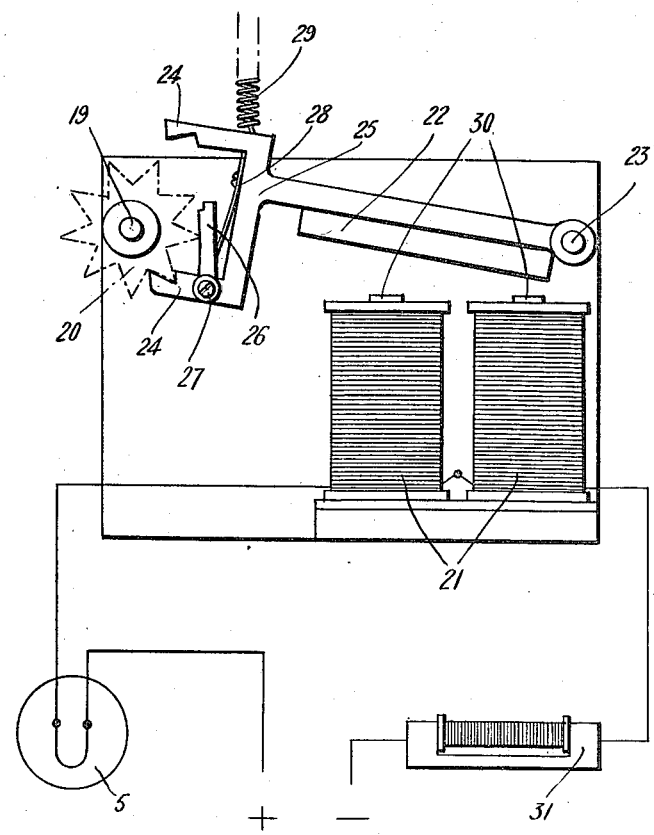

Patented Mar. 6, 1923.

1,447,403

UNITED STATES PATENT OFFICE.

REGINALD IGNATIUS ATHERTON, OF NORTH FINCHLEY, ENGLAND.

APPARATUS FOR EXHIBITING PICTURES.

Application filed March 22, 1921. Serial No. 454,593.

*To all whom it may concern:*

Be it known that I, REGINALD IGNATIUS ATHERTON, subject of the King of Great Britain and Ireland, residing at Elmdene, Ballards Lane, North Finchley, in the county of Middlesex, England, have invented a certain new and useful Improvement in Apparatus for Exhibiting Pictures, of which the following is a specification.

My invention relates to automatic optical apparatus for exhibiting or protecting a series of pictures alternately for advertising or other purposes and has for its object to provide a cheap, simple and self-contained apparatus which will automatically exhibit or project a series of different pictures in turn, and which will operate automatically on being merely connected in a suitable electric circuit.

According to this invention, I employ a suitable electric lamp as an illuminant, a suitable thermally actuated contact, and an electro magnet, which latter actuates suitable mechanism for moving a picture carrying disc, band or the like, intermittently so as to exhibit a series of pictures in turn. The thermally actuated contact causes the electro magnet to be intermittently operated at the required periods, so that one picture at a time will be illuminated and exhibited or projected upon a screen or other suitable surface. The lamp may be connected so that it is extinguished, or illuminated when the mechanism is actuated by the electro magnet or connected so that the lamp is permanently lighted.

In order that my invention may be more readily understood, reference is made to the accompanying sheet of illustrative drawings, in which:—

Figure 3 is a diagrammatic illustration of the mechanism for intermittently moving the picture disc.

Figure 1:
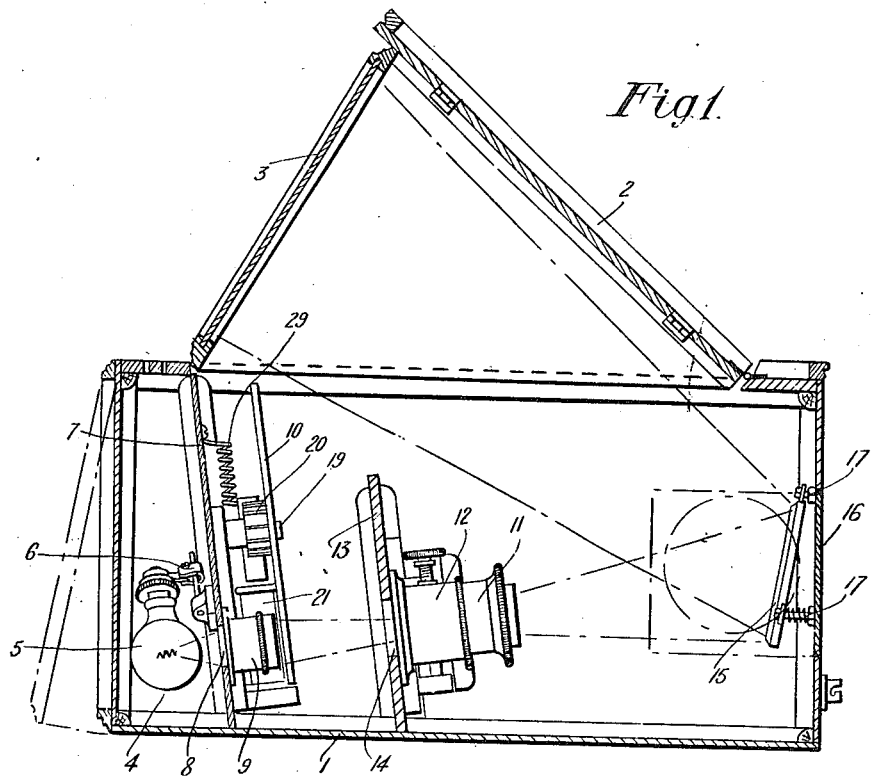
Figure 1 is a sectional elevation of an apparatus constructed according to my invention for the exhibition of pictures for advertising and other purposes, provided with a self contained screen upon which the pictures may be viewed.
Figure 2:
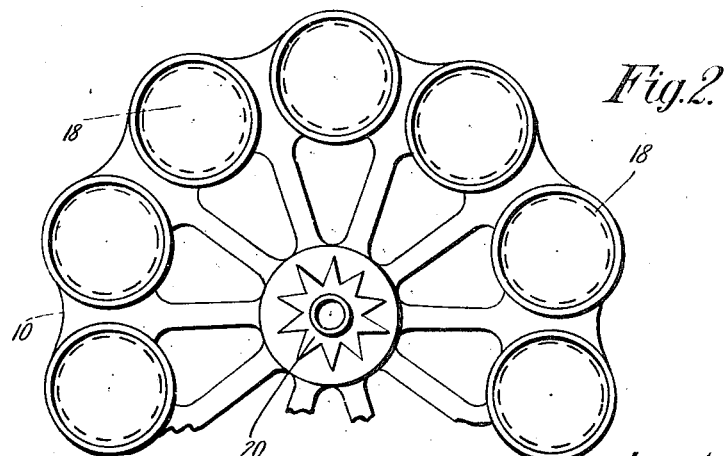
Figure 2 is a partial elevation of a suitable construction of picture carrying disc, and

Referring to the drawings, the apparatus is enclosed in a self contained casing 1, provided on its upper surface with a hinged lid 2 adapted to be raised to enable the translucent screen 3 to be turned to the position indicated in the drawing, in which it will be supported by the upper edge of the lid 2 so as to receive the pictures projected by the apparatus, which may thus be viewed upon the screen 3.

At one end of the casing 1 is provided a compartment 4 in which is mounted a suitable electric lamp 5 supported on an adjustable bracket 6 mounted on the partition 7 in the casing 1. This lamp 5 is situated in the lower portion of the compartment 4 and opposite to an aperture 8 in the partition 7 and over this aperture 8 is mounted a condenser 9 to concentrate the light from the lamp 5 upon one of the pictures mounted near the edge of the movable picture disc 10. A suitable projecting lens 11 is carried in an adjustable mount 12 and supported upon a partition 13 in the casing in front of the picture disc so that the light transmitted through the picture disc by the condenser will pass through an aperture 14 in the partition 13, and through the lens 11, so as to be projected onto a mirror or reflector 15, adapted to be adjusted by the screws 17 to correctly project the image upon the screen 3 where it may be viewed from without. The reflector 15 is adjustably mounted on the hinged door 16 by the adjusting screws 17. When the door 16 is turned inward as indicated in dotted lines, the picture may be projected through the opening onto a wall or the like.

The picture disc 10 is adapted to be moved intermittently for the space of one picture by automatic mechanism which will now be described.

The picture disc 10 which may conveniently comprise a suitable perforated disc is provided with a series of transparent pictures 18 arranged at intervals around its periphery, and this picture disc 10 is mounted so as to turn freely upon a fixed pivot pin 19 passing through its centre. Mounted concentrically with the picture disc 10 and secured thereto is a ratchet or star wheel 20 having a similar number of teeth to the number of pictures upon the picture disc. Mounted upon the partition 7 is an electro magnet 21 having an armature 22 pivoted at 23. The free end of this pivoted armature 22 is provided with fixed pins 24 projecting from its end 25 and which engage alternately with the teeth of the star wheel 20. The end 25 of the pivoted armature 22 also carries a hinged pawl 26 adapted to turn about a pivot 27 against the action of the spring 28. A coil spring 29 acts to normally hold the pivoted armature 22 out of engagement with the cores 30 of the electro magnet 21.

The electro magnet 21 is connected in circuit with the electric lamp 5, and a thermo flasher 31. This thermo flasher 31 comprises any suitable thermo electric contact device, in which the passage of the electric current causes the device to become heated so that the expansion will make or break contact and so allow an intermittent passage of current through the electro magnet 21 and the lamp 5.

When the electro magnet 21 is energized, the armature 22 will be drawn down about its pivot 23, and the pawl 26 will turn about its pivot 27 against the action of the spring 28 until it passes over one of the teeth upon the star wheel 20 so as to engage on the other side thereof. During this operation the lamp 5 is illuminated and the picture 18, which is opposite the condenser 9 will be transmitted by the projecting lens 11 onto the reflector 15 and thence to the viewing screen 3. When the thermo flasher 31 breaks contact, the lamp 5 will be extinguished and the electro magnet 21 de-energized. This will release the armature 22 so that its end 25 will rise under the influence of the spring 29. The pawl 26 engaging against one of the teeth on the star wheel 20 will cause this wheel to be rotated so as to bring the next picture 18 upon the disc opposite to the condenser 9 ready to be projected on to the screen 3 when the lamp 5 is next illuminated. The fixed pins 24 upon the end 25 of the armature 22 act as stops to engage the teeth on the star wheel 20 so as to ensure the picture disc 10 stopping in the correct position with one of the pictures 18 correctly centered over the condenser 9.

All that is necessary to bring the apparatus into operation is to connect the lamp and electro magnet in a suitable electric circuit by means of a plug and lead, to a suitable lamp holder or socket. The operation of the apparatus will then be completely automatic, each of the pictures 18 on the picture disc 10 being exhibited in turn on the screen 3, and the apparatus will continue in action as long as desired. When the apparatus is not in use, the screen 3 may be folded down and covered by the lid 2, which turns about its hinge so as to close the aperture in the top of the casing 1.

The apparatus also may if desired be constructed without the self contained screen so as to be used for exhibiting the pictures upon any external screen or upon a wall or ceiling in any convenient place. For this purpose the door 16 on which the mirror 15 is mounted can be opened and the picture be projected on a screen as usual with optical lanterns.

What I claim as my invention and desire to obtain by Letters Patent is:—

1. Apparatus for exhibiting pictures, comprising in combination an optical projection device, a means of illumination, a disc having a series of pictures thereon and mounted for rotation between said lamp and said optical projection device an electro-magnetic device including a pivoted armature associated with means adapted to move said disc, said electro-magnetic device being intermittently energized and de-energized by a flow of current controlled by a thermo electric contact, a toothed wheel on the picture disc, an electro magnet, a hinged armature adapted to be attracted by the magnet, a pawl upon the armature adapted to engage the toothed wheel to move the picture disc and projecting pins upon the armature to engage the toothed wheel to hold the disc steady.

2. In apparatus for exhibiting pictures, a casing, a disc having a series of pictures arranged round its edge mounted to turn freely on a pivot, a toothed wheel on the picture disc, an electro magnet, a hinged armature adapted to be attracted by the magnet, a pawl upon the armature adapted to engage the toothed wheel to move the picture disc, when the armature is released, a spring to withdraw the armature when released, projecting pins upon the armature to engage the toothed wheel to hold the disc steady, a thermo electric contact device to permit an intermittent flow of current to the magnet, and an electric lamp to illuminate the pictures connected in circuit with the electro magnet and thermo electric contact so that the lamp will be illuminated whilst the picture disc is stationary, the magnet acting when energized to move the armature to a position to turn the picture disc through its toothed wheel when the magnet is de-energized and the lamp extinguished.

3. In apparatus for exhibiting pictures, a casing, a disc having a series of pictures arranged round its edge mounted to turn freely on a pivot, a toothed wheel on the picture disc, an electro magnet, a hinged armature adapted to be attracted by the magnet, a pawl upon the armature adapted to engage the toothed wheel to move the picture disc, projecting pins upon the armature to engage the toothed wheel to hold the disc steady, a thermo electric contact device to permit an intermittent flow of current to the magnet, an electric lamp to illuminate the pictures, a compartment at one end of the casing in which the lamp is mounted, a condenser supported on a partition in the casing, a projecting lens mounted on a further partition, a reflector adjustably mounted on the end wall of the casing and a screen arranged in the top of the casing to receive the image transmitted from the reflector and adapted to fold down when not in use.

4. In apparatus for exhibiting pictures, a casing, a disc having a series of pictures arranged round its edge mounted to turn freely on a pivot, a toothed wheel on the picture disc, an electro magnet, a hinged armature adapted to be attracted by the magnet, a pawl upon the armature adapted to engage the toothed wheel to move the picture disc when the armature is released, a spring to withdraw the armature when released, projecting pins upon the armature to engage the toothed wheel to hold the disc steady, a thermo electric contact device to permit an intermittent flow of current to the magnet, an electric lamp to illuminate the pictures connected in circuit with the electro magnet and thermo electric contact so that the lamp will be illuminated whilst the picture disc is stationary the magnet acting when energized to move the armature to a position to turn the picture disc through its toothed wheel when the magnet is de-energized and the lamp extinguished, a compartment at one end of the casing in which the lamp is mounted, a condenser supported on a partition in the casing, a projecting lens mounted on a further partition, a reflector adjustably mounted on the end wall of the casing and a screen arranged in the top of the casing to receive the image transmitted from the reflector and adapted to fold down when not in use.

5. In apparatus for exhibiting pictures, a casing, a disc having a series of pictures arranged round its edge mounted to turn freely on a pivot, a toothed wheel on the picture disc, an electro magnet, a hinged armature adapted to be attracted by the magnet, a pawl upon the armature adapted to engage the toothed wheel to move the picture disc, projecting pins upon the armature to engage the toothed wheel to hold the disc steady, a thermo electric contact device to permit an intermittent flow of current to the magnet,—an electric lamp to illuminate the pictures, a compartment at one end of the casing in which the lamp is mounted, a condenser supported on a partition in the casing, a projecting lens mounted on a further partition, a reflector adjustably mounted on the end wall of the casing,—a screen arranged in the top of the casing to receive the image transmitted from the reflector and adapted to fold down when not in use, a hinged door in the end of the casing on which the reflector is mounted so that by opening the door the pictures may be projected through the opening thus uncovered directly upon a wall or external screen.

6. In apparatus for exhibiting pictures, a casing, a disc having a series of pictures arranged round its edge mounted to turn freely on a pivot, a toothed wheel on the picture disc, an electro magnet, a hinged armature adapted to be attracted by the magnet, a pawl upon the armature adapted to engage the toothed wheel to move the picture disc when the armature is released, a spring to withdraw the armature when released, projecting pins upon the armature to engage the toothed wheel to hold the disc steady, a thermo electric contact device to permit an intermittent flow of current to the magnet,—an electric lamp to illuminate the pictures, connected in circuit with the electro magnet and thermo electric contact so that the lamp will be illuminated whilst the picture disc is stationary the magnet acting when energized to move the armature to a position to turn the picture disc through its toothed wheel when the magnet is de-energized and the lamp extinguished, a compartment at one end of the casing in which the lamp is mounted, a condenser supported on a partition in the casing, a projecting lens mounted on a further partition, a reflector adjustably mounted on the end wall of the casing,—a screen arranged in the top of the casing to receive the image transmitted from the reflector and adapted to fold down when not in use, and a hinged door in the end of the casing on which the reflector is mounted so that by opening the door the pictures may be projected through the opening thus uncovered directly upon a wall or external screen.

REGINALD IGNATIUS ATHERTON